United States Patent [19]

Miyata et al.

[11] Patent Number: 5,543,859
[45] Date of Patent: Aug. 6, 1996

[54] HORIZONTAL CONTOUR EMPHASIZING SIGNAL PROCESSOR

[75] Inventors: Minoru Miyata; Shigeru Kawakami, both of Suita, Japan

[73] Assignee: Matsushita Electric Industrial Co., Ltd., Osaka, Japan

[21] Appl. No.: 418,247

[22] Filed: Apr. 6, 1995

[30] Foreign Application Priority Data

Apr. 15, 1994 [JP] Japan ..................... 6-077135

[51] Int. Cl.⁶ .............. H04N 5/208; H04N 9/68
[52] U.S. Cl. ............. 348/625; 348/629; 348/630
[58] Field of Search .................... 348/625, 630, 348/629, 712, 26; 358/37, 166, 96, 162; 382/254, 266; H04N 5/208, 9/68

[56] References Cited

U.S. PATENT DOCUMENTS 4,994,915  2/1991  Takahashi ................ 348/625

Primary Examiner—Safet Metjahic
Assistant Examiner—Sherrie Hsia
Attorney, Agent, or Firm—Ratner & Prestia

[57] ABSTRACT

An improved horizontal contour emphasizing signal processor is provided with a detector to detect a period during which luminance signal changes are produced, a generator to generate a rectangular-wave signal during this period, and a multiplier for multiplying a first horizontal contour emphasizing signal derived from the luminance signal to the rectangular-wave signal to generate a second horizontal contour emphasizing signal, and in this case, a preshoot is added to the input luminance signal waveform at the starting part of a radical waveform change and an overshoot is added at the ending part of the waveform change in order to perform finer horizontal contour emphasizing.

10 Claims, 7 Drawing Sheets

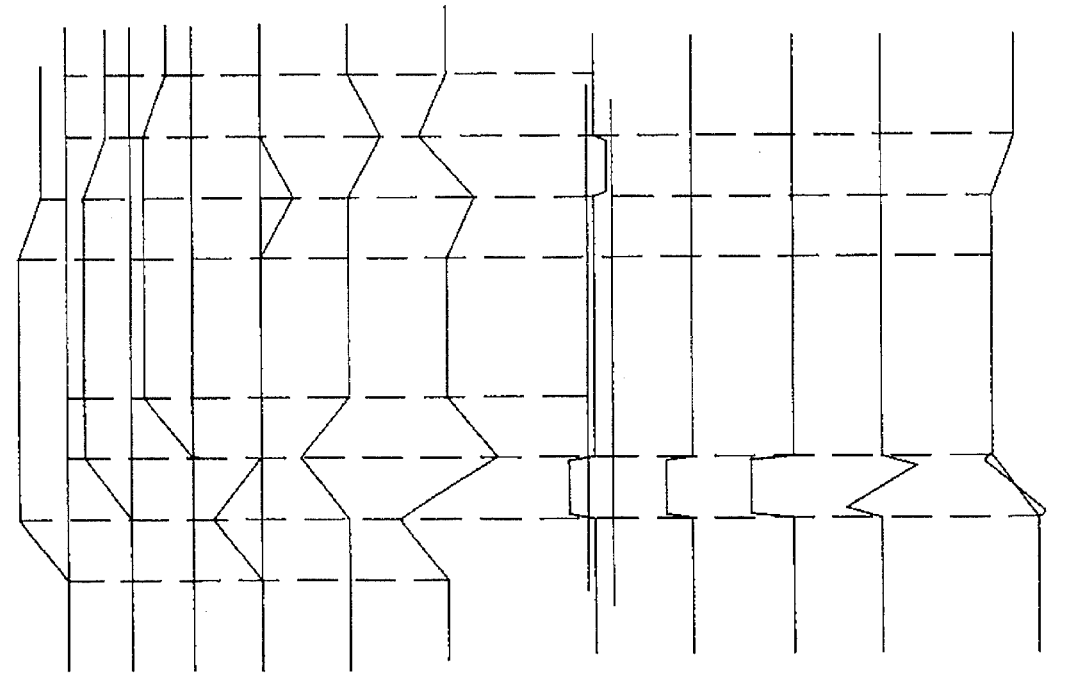
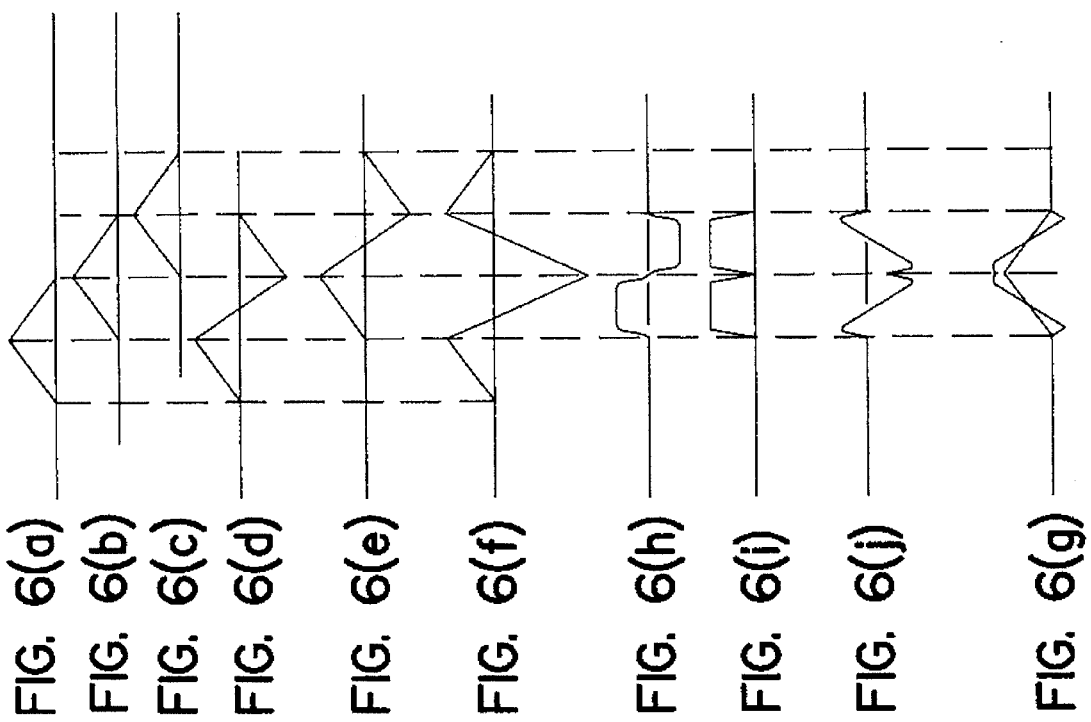

HORIZONTAL CONTOUR EMPHASIZING SIGNAL PROCESSOR

BACKGROUND OF THE INVENTION

The present invention relates to a horizontal-contour emphasizing signal processor to be incorporated in video-signal processor of conventional or high-definition television receiver.

A structure of horizontal-contour emphasizing signal processor incorporated within conventional television receiver is now explained next. FIG. 1 shows a block diagram of said processor circuit, and FIGS. 2(a)–2(g) show signal-waveforms observed at various points in said block diagram shown in FIG. 1.

In FIG. 1, 1 is a first delay-circuit, 2 is a second delay-circuit, 3 is a synthesizing circuit, 4 is a first subtraction circuit, 5 is a second subtraction circuit, and 6 is a third subtraction circuit. FIG. 2(a) illustrates an input luminance-signal, FIG. 2(b) illustrates an output signal of first delay-circuit 1, FIG. 2(c) illustrates an output-signal of second delay-circuit 2, FIG. 2(d) illustrates an output-signal of first subtraction circuit 4, FIG. 2(e) illustrates an output-signal of second subtraction circuit 5, FIG. 2(f) illustrates an output-signal of third subtraction circuit 6, and FIG. 2(g) illustrates an output luminance-signal. The output-signal illustrated in FIG. 2(f) is a horizontal contour emphasizing signal.

The operation of thus constructed horizontal-contour emphasizing signal processor incorporated in conventional television receiver is now explained by referring FIGS. 1 and 2(a)–2(g). The input luminance-signal of FIG. 2(a) is supplied to first delay-circuit 1 and to first subtraction circuit 4 at the same time, and the output-signal of FIG. 2(b) is produced at the output of first delay-circuit 1.

Then output-signal of FIG. 2(b) is supplied to second delay-circuit 2, first subtraction circuit 4, second subtraction circuit 5, and synthesizing circuit 3, producing the output-signal of FIG. 2(c) at the output of second delay-circuit 2, and the output-signal of FIG. 2(d) at the output of first subtraction circuit 4.

The output signal of FIG. 2(c) of second delay-circuit 2 is supplied to second subtraction-circuit 5, producing the output-signal of FIG. 2(e) at the output of second subtraction-circuit 5. Then, the output-signal of FIG. 2(e) of second subtraction circuit is subtracted from the output-signal of FIG. 2(d) of first subtraction circuit 4 by using third subtraction circuit 6 producing the output-signal of FIG. 2(f) of the third subtraction circuit 6.

On the other hand, the output-signal of FIG. 2(f) is supplied to synthesizing circuit 3 as a horizontal contour emphasizing signal, and the output-signal of FIG. 2(b) of first delay-circuit 1 is synthesized properly with the horizontal contour emphasizing signal, and the output luminance-signal of FIG. 2(g) is produced by this.

As seen from the waveforms shown in FIGS. 2(a)–(g), when synthesizing circuit 3 of conventional construction is employed to synthesize the horizontal-contour emphasizing signal, spreads of its signal components over the period corresponding to the first delay time produced by said first delay-circuit 1 at first and the second delay-time produced later by second delay circuit 2 during the luminance signal change, are produced.

Therefore, a horizontal-contour emphasizing signal of poor quality is produced by this, and thus, this is unsatisfactory to produce the video-signals for high-definition television.

SUMMARY OF THE INVENTION

The present invention is to offer a signal processor by which highly improved horizontal-contour emphasizing signals usable for high-definition video images can be synthesized within a period of luminance signal change instead of a period over the luminance signal change.

With the invented horizontal-contour emphasizing signal processor, a preshoot of proper magnitude is formed at the starting part of abrupt waveform change of input luminance signal in a direction opposite to the direction of said signal change, and an overshoot of proper magnitude is formed at the ending part thereof in a direction same as the direction of said signal change.

Thus, by generating a rectangular-signal of which period is coincided with the duration of said waveform change, and by multiplying said rectangular-signal to a first horizontal contour emphasizing signal spread over a period of luminance-signal waveform change, a second horizontal contour emphasizing signal from which its signal components spread over the duration other than the duration of said luminance signal change are eliminated by utilizing the fact that the potentials at the regions before and after said rectangular-wave are nearly zero, can be produced. By properly synthesizing output signal of first delay circuit with said second horizontal-contour emphasizing signal, a high-quality horizontal-contour emphasizing signal available for high-definition video signals can be produced.

In order to accomplish this, the invented horizontal-contour emphasizing signal processor is constituted of a first delay circuit by which the luminance-signal can be delayed by any desired length, a second delay-circuit by which the output-signal of said first delay-circuit can be delayed by any length, a first subtraction circuit subtracting the output-signal of said first delay-circuit from the input-signal of said first delay-circuit, a second subtraction circuit subtracting the output-signal of said second delay circuit from the input-signal of said second delay circuit, a first multiplication circuit multiplying the output-signal of said first subtraction circuit to the output of said second subtraction circuit, a second multiplication circuit squaring the output-signal of said first multiplication circuit, a limiter limiting the amplitude of output signal of said multiplication circuit, a third subtraction circuit subtracting the output-signal of said second subtraction circuit from the output of said first subtraction circuit, a third multiplication circuit multiplying the output-signal of said third subtraction circuit to the output-signal of said limiter, and a synthesizing-circuit synthesizing the output-signal of said third multiplication circuit with the output-signal of said first delay circuit.

By taking the presently explained circuit-construction, a high-quality horizontal-contour emphasizing signal produced within a period of luminance-signal change, so that a highly defined horizontal-contour emphasizing signal becomes available producing highly defined video images.

BRIEF DESCRIPTION OF THE DRAWINGS

FIGS. 4(a)–(j) illustrate signal waveforms observed at several points in a horizontal contour emphasizing signal processor in accordance with a first exemplary embodiment of the invention.

FIGS. 6(a)–(j) illustrate signal waveforms observed at several points in a horizontal contour emphasizing signal processor in accordance with the second exemplary embodiment of the invention.

FIGS. 8(a)–(k) illustrate signal waveforms observed at several points in a horizontal contour emphasizing signal processor in accordance with the third exemplary embodiment of the invention.

EXPLANATION OF THE SIGNS 1. first delay circuit,
2. second delay circuit,
3. synthesizing circuit,
4. 1st subtraction circuit,
5. 2nd subtraction circuit,
6. 3rd subtraction circuit,
11. 1st multiplication circuit
12. 2nd multiplication circuit
13. limiter
14. 3rd multiplication circuit
15. differential circuit,
16. 4th multiplication circuit,
17. selection circuit,

EXEMPLARY EMBODIMENTS

The horizontal-contour emphasizing signal processors which are exemplary embodiments of the invention, are now explained below by referring the attached drawings.

1st EMBODIMENT

Figure 1:
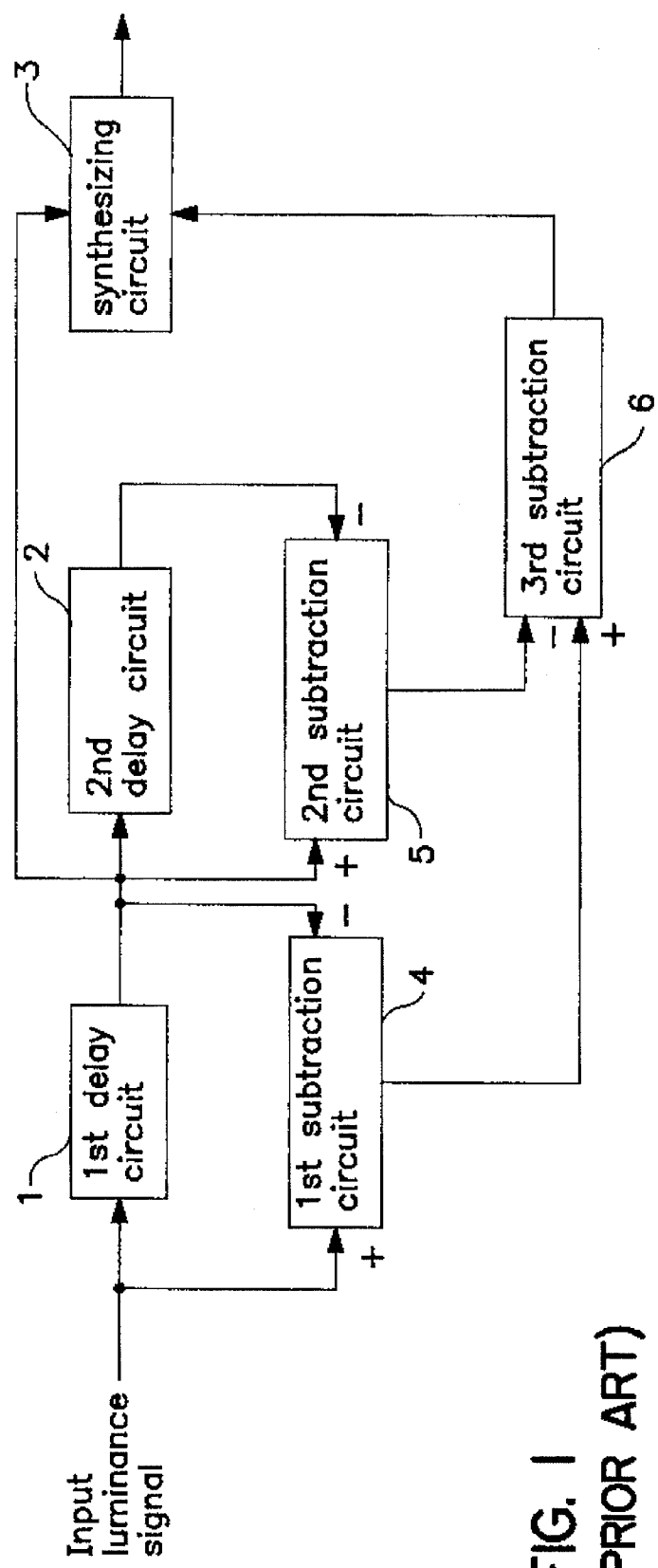
FIG. 1 is a block diagram of a conventional horizontal-contour emphasizing signal processor.
Figures 2A, 2B, 2C, 2D, 2E, 2F, 2G:
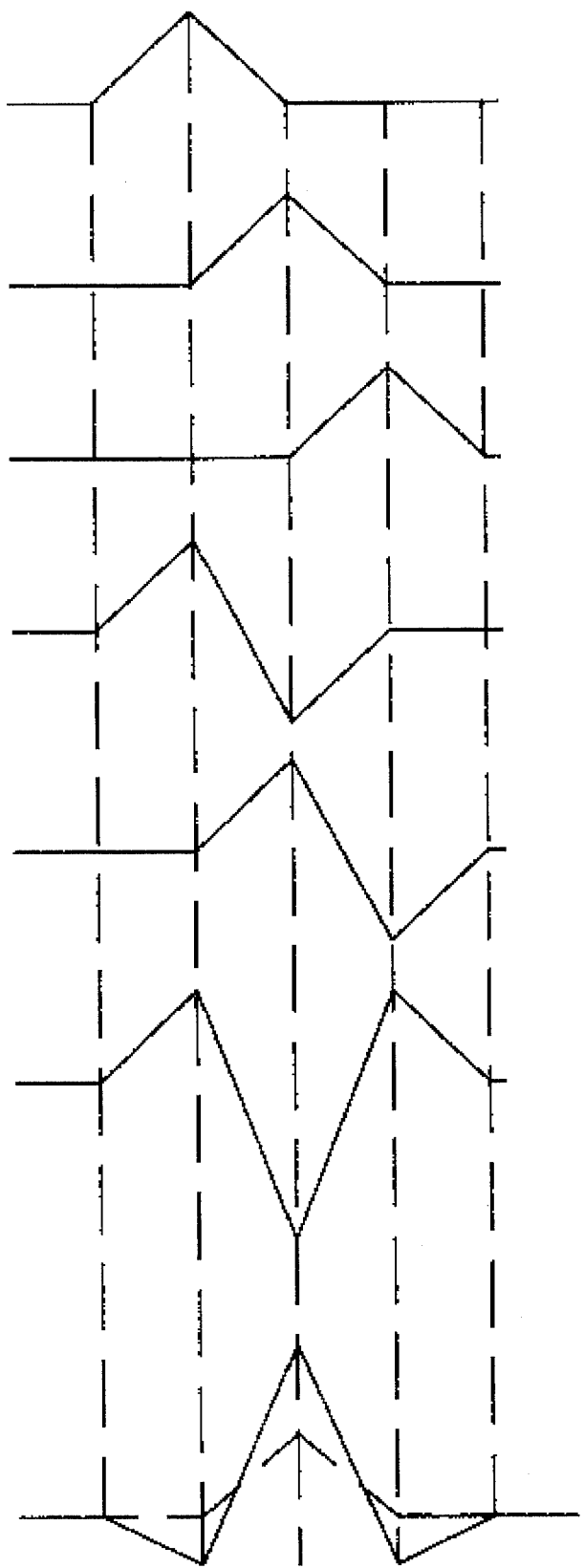
FIGS. 2(a)–(g) illustrate signal waveforms at several points in conventional horizontal-contour emphasizing signal processor.
Figure 3:
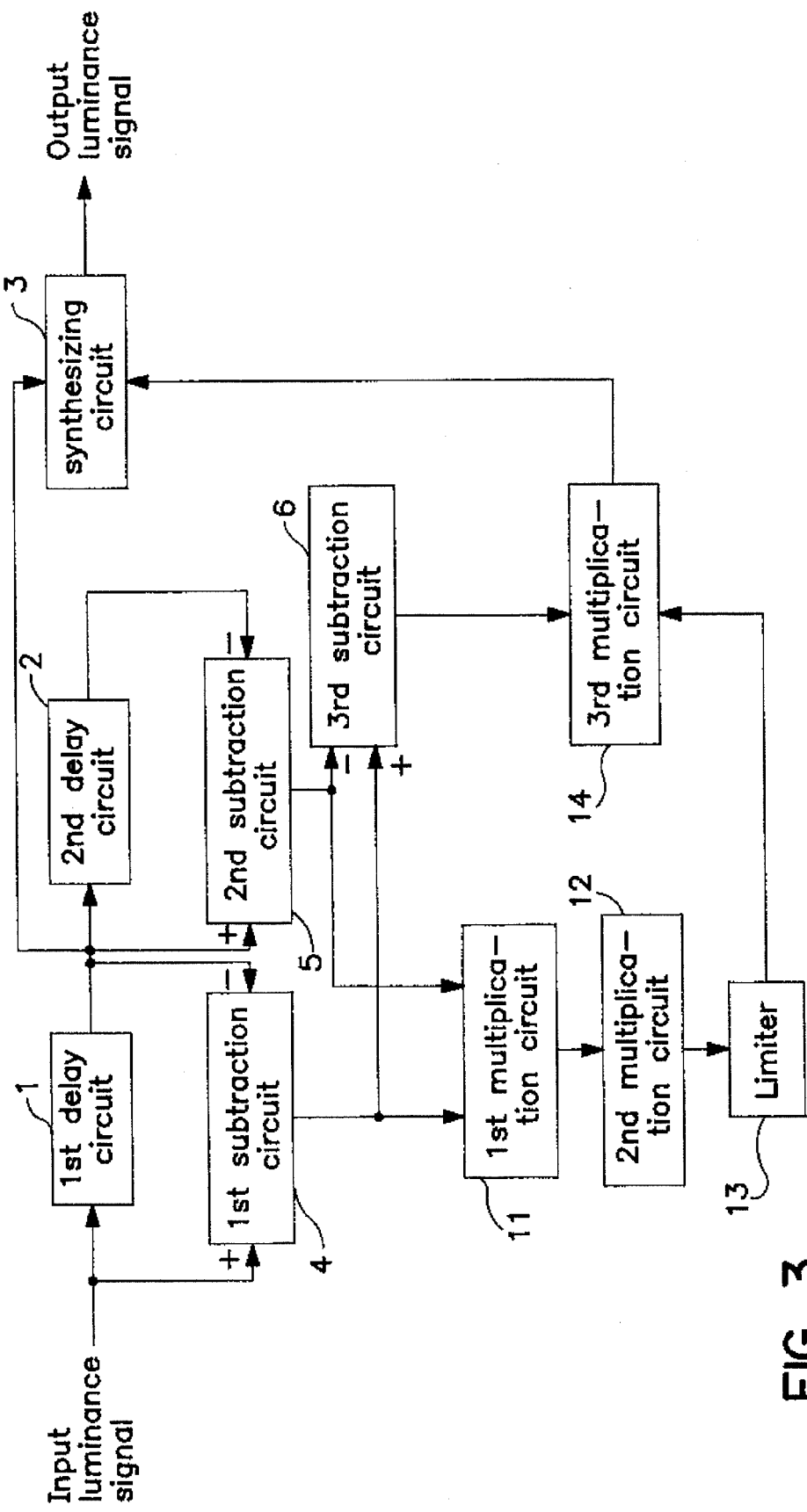
FIG. 3 is a block diagram of a first exemplary embodiment of the invention showing a horizontal-contour emphasizing signal processor.

FIG. 3 shows a block diagram of the horizontal-contour emphasizing signal processor which is the first embodiment of the invention, and FIGS. 4(a)–(j) show signal waveforms observed at several points in the block diagram shown in FIG. 3.

In FIGS. 3 and 4(a)–(j), the part in common with FIGS. 1 and 2(a)–2(g) are shown by common identification so that individual explanations may be omitted.

In FIG. 3, 11 is a first multiplication circuit, 12 is a second multiplication circuit, 13 is a limiter, and 14 is a third multiplication circuit. FIG. 4(h) illustrates an output-signal of first multiplication circuit 11, FIG. 4(i) illustrates an output-signal of limiter 13, and FIG. 4(j) illustrates an output-signal of third multiplication circuit 14.

The operation of the thus constructed horizontal-contour emphasizing signal processor circuit in accordance with the first exemplary embodiment of the invention is now explained by referring FIGS. 3 and 4(a)–(j).

Figure 4A:
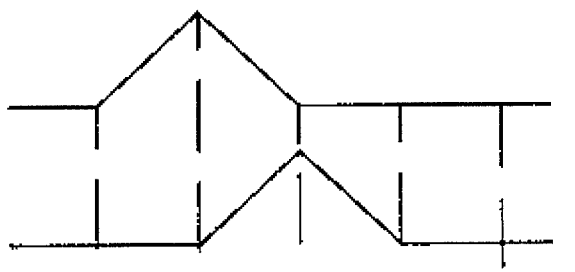
Figure 4C:

At first, as the input luminance-signal of FIG. 4(a) is supplied to first delay-circuit 1 and first subtraction circuit 4, the output-signal of FIG. 4(b) is obtained at the output of first delay-circuit 1. Then, the output-signal of FIG. 4(b) of first delay-circuit 1 is supplied to second delay circuit 2, first subtraction circuit 4, second subtraction circuit 5, and synthesizing-circuit 3 so that the output-signal of FIG. 4(c) is generated at the output of second delay circuit 2.

Figure 4D:
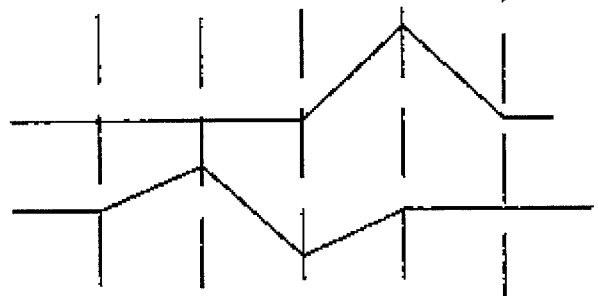

Furthermore, the output-signal of FIG. 4(d) is obtained at the output of first subtraction circuit 4 by subtracting the output-signal of FIG. 4(b) of first delay-circuit 1 from the input-signal of FIG. 4(a), and the subtracted signal of FIG. 4(d) is supplied to third subtraction circuit 6. Moreover, the output-signal of FIG. 4(c) of second delay-circuit 2 is supplied to second subtraction circuit 5, and the output-signal of FIG. 4(e) of second subtraction circuit 5 is obtained by subtracting the output-signal of FIG. 4(c) from the output-signal of FIG. 4(b) of first delay-circuit 1, and the output-signal of FIG. 4(e) is supplied to third subtraction circuit 6.

Figure 4F:
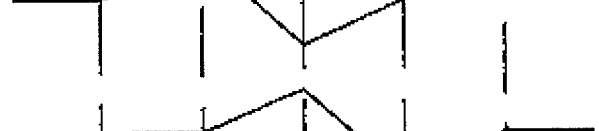
Figure 4H:
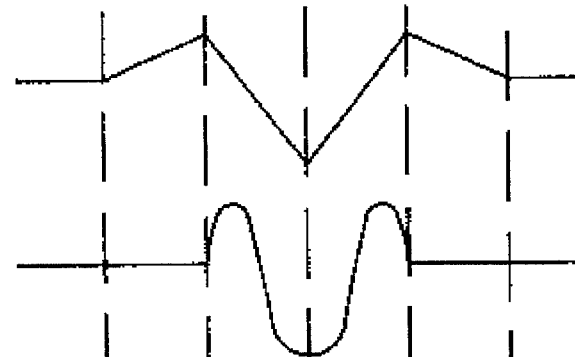
Figure 4I:
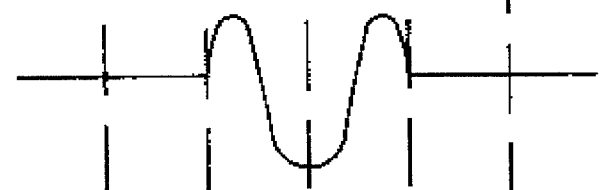
Figure 4J:
Figure 4G:
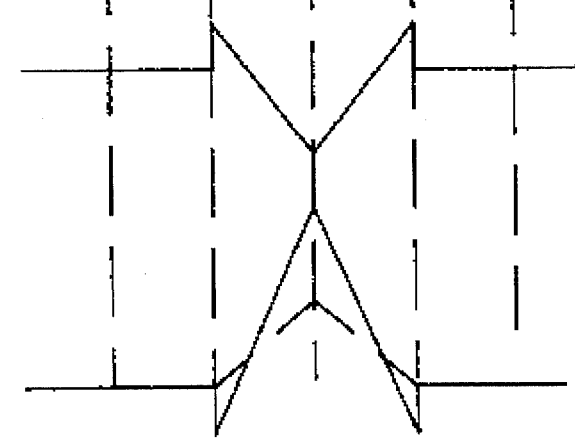

Then, the output-signal of FIG. 4(e) of second subtraction circuit 5 is subtracted from the output-signal of FIG. 4(d) of first subtraction circuit 4 by using third subtraction circuit 6, and by this, the output-signal of FIG. 4(f) of third subtraction circuit 6 is obtained. In this case, the output signal of FIG. 4(f) corresponds to first horizontal-contour emphasizing signal.

Since the delay-time of first delay-circuit 1 and the delay time of second delay-circuit 2 are extremely short and these are less than 40 nanoseconds, the magnitude of the output-signal of FIG. 4(f) for a slowly changing signal should be negligible. Furthermore, the output-signal of FIG. 4(d) of subtraction circuit 4 is multiplied to the output-signal of FIG. 4(e) of second sub-traction circuit 5 by using first multiplication circuit 11 in order to determine a period of input luminance-signal change, and by this, the output-signal of FIG. 4(h) of first multiplication circuit 11 took place during said period can be obtained.

The output-signal of FIG. 4(h) of the first multiplication circuit 11 is then squared by means of second multiplication circuit 12, and the output of this is inputted in limiter 13 limiting the amplitude of output signal of second multiplication circuit 12. Thus, rectangular output-signal of FIG. 4(i) having a period equal to the detected period can be obtained.

Although two dips are theoretically produced in the signal of FIG. 4(i) outputted from limiter 13, those are virtually negligible considering the frequency-characteristics of the actual circuit. Then, the output-signal of FIG. 4(j) of the third multiplication circuit 14 is obtained by supplying the output-signal of FIG. 4(i) and the output-signal of FIG. 4(f) of third subtraction circuit 6 to the input of third multiplication circuit 14, yielding the output-signal of FIG. 4(j). The thus-obtained output-signal of FIG. 4(j) in this case, should correspond to the second horizontal contour emphasizing signal. The output luminance-signal of FIG. 4(g) can be obtained by supplying the output-signal of FIG. 4(j) as the second horizontal-contour emphasizing signal to synthesizing circuit 3 in order to properly combine the output signal of FIG. 4(j) with the output-signal of FIG. 4(b) of first delay-circuit 1.

As seen from the waveforms shown in FIGS. 4(a)–4(j), since said horizontal contour emphasizing signal is produced and synthesized during the period of rapid luminance-signal change, a highly defined horizontal-contour emphasizing signal can be obtained.

2nd EMBODIMENT

Figure 5:
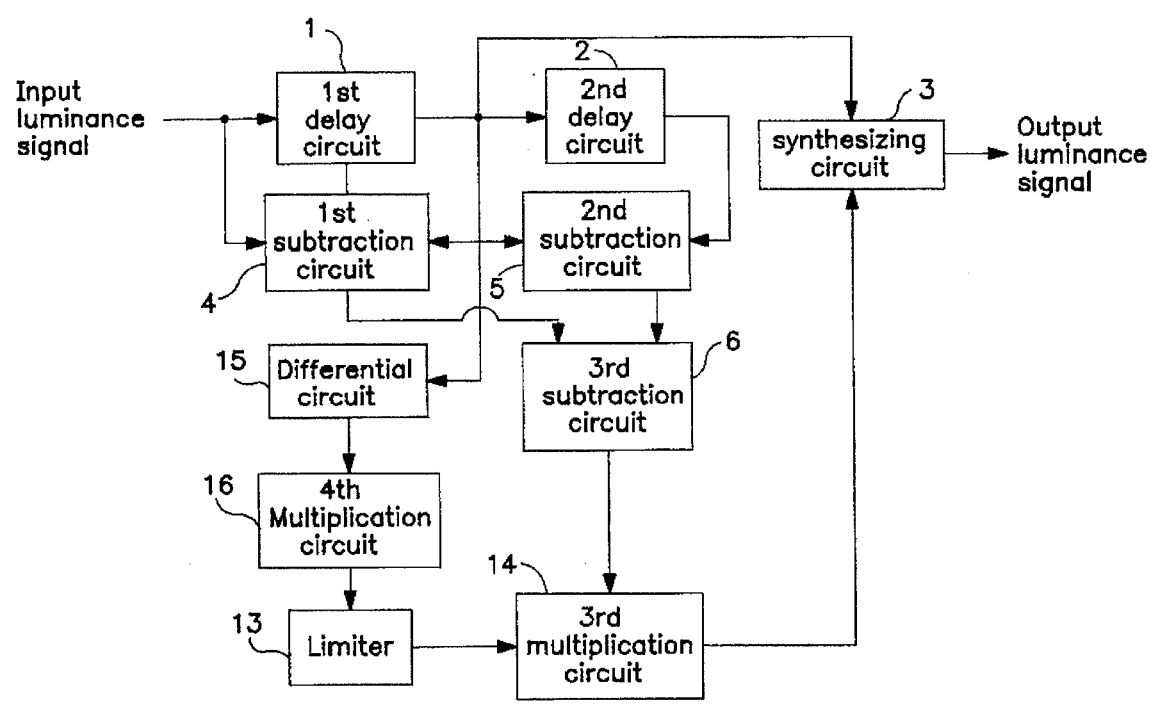
FIG. 5 is a block diagram of a horizontal-contour emphasizing signal processor in accordance with a second exemplary embodiment of the invention.

FIG. 5 shows a block diagram of the horizontal-contour emphasizing signal processor which is the second embodiment of the invention. FIGS. 6(a)–(j) show signal waveforms observed at several points in the block diagram shown in FIG. 5.

In FIGS. 5 and 6(a)–(j), the parts common with the parts shown in FIGS. 3 and 4(a)–(j), are identified by common identification (except for those signals indicated below) so that individual explanations may be omitted.

In FIGS. 5 and 6(a)–(j), 15 is a differential circuit, 16 is the fourth multiplication circuit, FIG. 6(h) illustrates an output-signal of differential circuit 15, and FIG. 6(i) illustrates an output-signal of limiter 13.

The operation of the horizontal-contour emphasizing signal processor constructed as shown in FIG. 5 is now explained by referring FIGS. 5 and 6(a)–(j).

At first, the luminance-signal of FIG. 6(a) is inputted to first delay circuit 1 and first subtraction circuit 4, obtaining signal of FIG. 6(b) at the output of first delay circuit 1. The output-signal of FIG. 6(b) of first delay circuit 1 is supplied simultaneously to second delay circuit 2, first subtraction circuit 4, second subtraction circuit 5, and synthesizing-circuit 3, obtaining the signal of FIG. 6(c) at the output of second delay circuit 2.

Furthermore, the output-signal of FIG. 6(d) is obtained at the output of first subtraction circuit 4, and the output-signal of FIG. 6(d) is obtained by subtracting the signal of FIG. 6(b) of the first delay-circuit 1 from the input-signal of FIG. 6(a), and then, the output-signal of FIG. 6(d) is supplied to third subtraction circuit 6. The output-signal of FIG. 6(c) of second delay-circuit 2 is then supplied to second subtraction circuit 5, and the output-signal of FIG. 6(c) is subtracted from the output-signal of FIG. 6(b) of first delay-circuit 1 yielding the output-signal of FIG. 6(e) of second subtraction circuit 5. The output signal of FIG. 6(e) is furtiler supplied to third subtraction circuit 6.

Then, the output-signal of FIG. 6(e) of the second subtraction circuit is subtracted from the output-signal of FIG. 6(d) of the first subtraction circuit 4 obtaining the output-signal of FIG. 6(f) of third subtraction circuit 6. Since both the delay time of said first delay circuit 1 and the delay time of said second delay-circuit 2 are extremely short, and are less than 40 nanoseconds, the output-signal of FIG. 6(f) for a slowly changing signal should be negligible.

Furthermore, the output-signal of FIG. 6(h) is obtained by differentiating the output-signal of FIG. 6(b) of the first delay-circuit 1 by using differential circuit 15. Then, the output-signal of FIG. 6(h) is squared by using fourth multiplication circuit 16, and the output thereof is inputted into limiter 13 where the amplitude of it is limited. Thus, the output-signal of FIG. 6(i) of which amplitude is limited after it is squared can be obtained.

By inputting the signal of FIG. 6(i) and the signal of FIG. 6(f) of third subtraction circuit 6 into third multiplication circuit 14, the output-signal of FIG. 6(f) is multiplied by the output-signal of FIG. 6(i), yielding the output-signal of FIG. 6(j).

Then, the output-signal of FIG. 6(j) is obtained from third multiplication circuit 14 is supplied to synthesizing circuit 3 as a second horizontal-contour emphasizing signal, and is synthesized properly with the output-signal of FIG. 6(b) of the first delay-circuit 1 in order to obtain the output-luminance signal of FIG. 6(g).

As seen from the waveforms shown in FIG. 6(a)–(j), the obtained horizontal-contour emphasizing signal is produced and synthesized withill the changing period of luminanee signal, so that the horizontal-contour can be emphasized by this highly defined signal.

3rd EMBODIMENT

Figure 7:
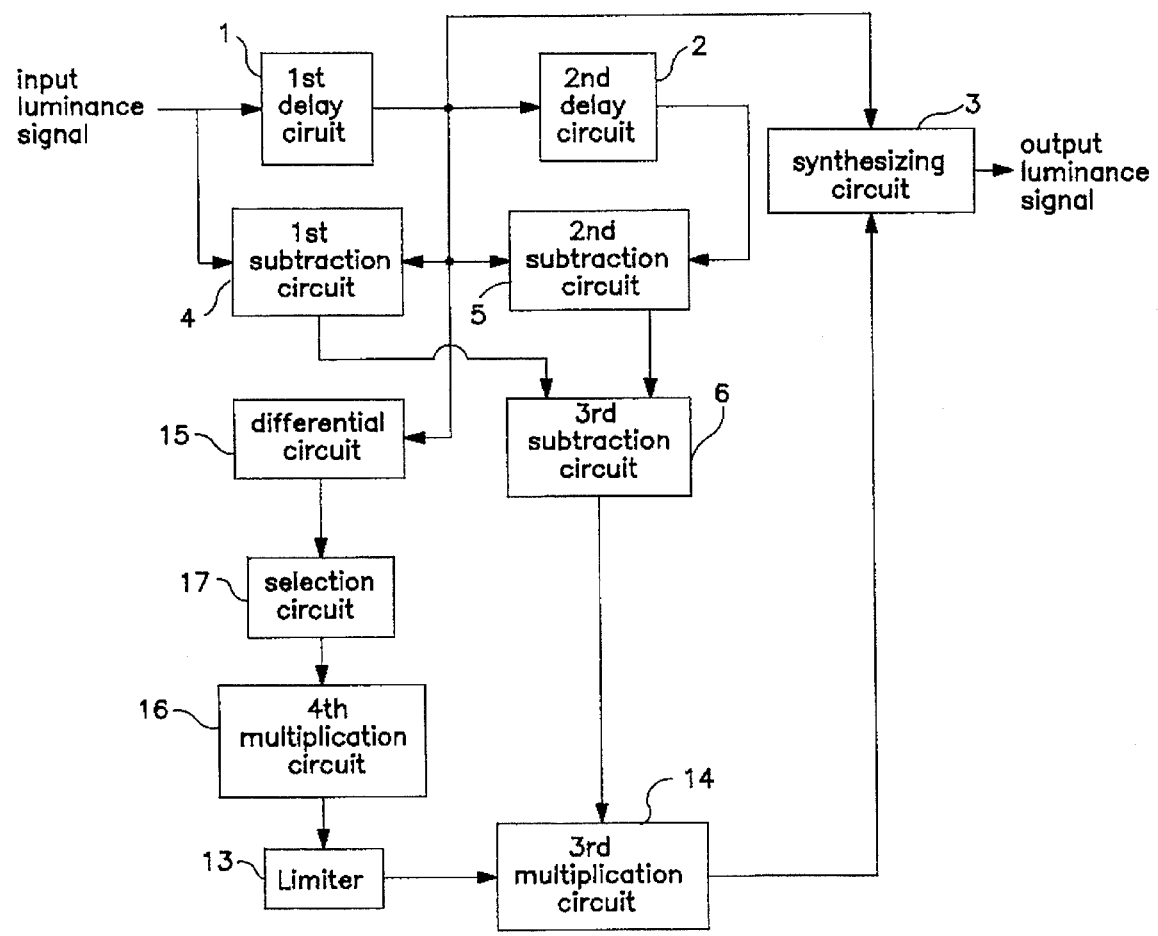
FIG. 7 is a block diagram of a horizontal-contour emphasizing signal processor in accordance with a third exemplary embodiment of the invention.

FIG. 7 shows a block diagram of the horizontal-contour emphasizing signal processor circuit which is the third embodiment of the invention. In FIGS. 7 and 8(a)–(k), the parts common with the parts shown in FIGS. 5 and 6(a)–(j) are identified by common identification (except for those signals indicated below) so that individual explanations may be omitted.

In FIGS. 7 and 8(a)–(k), 17 is a selecting circuit selecting output signal K of differential circuit 15 depending on its amplitude or waveform duration. For example, the output-signal of FIG. 8(k) can be obtained by selecting only the signals having an amplitude of more than a predetermined threshold value. The output-signal of FIG. 8(k) is then supplied to fourth multiplication circuit 16 where the signal FIG. 8(k) is squared and the output of multiplication circuit 16 is supplied to limiter 13 limiting the amplitude thereof to obtain the output-signal of FIG. 8(i) of limiter 13.

Then, the output-signal of FIG. 8(i) and the output-signal of FIG. 8(f) of third subtraction circuit 6 are supplied to third multiplication circuit 14, obtaining the output-signal of FIG. 8(j) of third multiplication circuit. The signal of FIG. 8(j) is supplied to synthesizing circuit 3 as a horizontal contour emphasizing signal, and is synthesized properly with the output-signal of FIG. 8(b) of first delay-circuit 2 in synthesizing circuit 3 yielding the output-luminance signal of FIG. 8(g).

As seen from the waveforms of embodiment 3 shown in FIGS. 8(a)–(k), in contrast to the adaptively selected waveform changing parts of luminance signal, the horizontal-contour emphasizing signal is generated within a period of rapid luminance signal change, and said horizontal-contour emphasizing signal is synthesized with said luminance-signal, and by this, a highly defined horizontal-contour emphasizing signal can be obtained.

As shown in Embodiments -1, -2, and -3 of the present invention, the horizontal-contour emphasizing signal can be generated within a period of rapid change of luminance signal, and only the changing parts of luminance signal to which the horizontal-contour emphasizing process should be applied, can be adaptively selected, so that highly defined horizontal-contour emphasizing signal realizing high-definition video images can be obtained.

Furthermore, since the threshold value for adaptive selection for emphasizing signal can be selected externally, the video image quality can be selectively changed according to the objects of video equipment in which the video image processor of the invention is incorporated.

Moreover, in the second and the fourth multiplication circuits shown in the above embodiments of the invention, the effects attainable by these would be the same if a power-multiplication of even degree such a biquadratic power multiplication other than the square multiplication is used.

What is claimed:

1. A horizontal contour emphasizing signal processor in which an input luminance signal is converted to a first horizontal contour emphasizing signal, further comprising:

detector means for detecting a period during which a change in the input luminance signal occurs, signal generator means for generating a generated signal during said period, multiplication means for multiplying said first horizontal contour emphasizing signal by said generated signal to produce a second horizontal contour emphasizing signal, delay means for delaying the input luminance signal for a predetermined period, and synthesizinq means for adding said second horizontal contour emphasizing signal to the input luminance signal delayed by said delay means.

2. A horizontal contour emphasizing signal processor comprising;

a first delay-circuit delaying an input luminance signal for an arbitrary period, a second delay-circuit delaying the output signal of the first delay-circuit for the arbitrary period, a first subtraction circuit subtracting the output-signal of said first delay-circuit from the input-signal of said first delay-circuit, a second subtraction circuit subtracting the output-signal of second delay-circuit from the input signal of said second delay-circuit, a first multiplication circuit multiplying the output-signal of the first subtraction circuit to the output-signal of the second subtraction circuit, a second multiplication circuit obtaining a power of the output-signal of said first multiplication circuit, a limiter limiting the amplitude of said power of the output-signal obtained by said second multiplication circuit, a third subtraction circuit subtracting the output-signal of said second subtraction circuit from the output-signal of said first subtraction circuit, a third multiplication circuit multiplying the output-signal of said third subtraction circuit to the output-signal of said limiter, and a synthesizing circuit combining the output-signal of said third multiplication circuit to the output-signal of said first delay-circuit.

3. A horizontal contour emphasizing signal processor according to claim 2 wherein;

the power multiplication of said second multiplication circuit is an even degree.

4. A horizontal contour emphasizing signal processor comprising;

a first delay-circuit delaying an input luminance signal for an arbitrary period, a second delay-circuit delaying the output-signal of said first delay circuit for the arbitrary period, a first subtraction circuit subtracting the output-signal of said first delay-circuit from the input-signal of said first delay-circuit, a second subtraction circuit subtracting the output-signal of said second delay-circuit from the input-signal of said second delay-circuit, a third subtraction circuit subtracting the output-signal of said second subtraction circuit from the output-signal of said first subtraction circuit, a differential circuit differentiating the output-signal of said first delay-circuit, a first multiplication circuit obtaining a power of the output-signal of said differential circuit, a limiter limiting the amplitude of output signal of said first multiplication circuit, a second multiplication circuit multiplying the output of said third subtraction circuit to the output-signal of said limiter, and a synthesizing circuit synthesizing the output-signal of said second multiplication circuit with the output-signal of said first delay-circuit.

5. A horizontal contour emphasizing signal processor according to claim 4 wherein;

the power multiplication of said first multiplication circuit is an even degree.

6. A horizontal contour emphasizing signal processor according to claim 4 wherein;

a selection circuit selecting the output-signal of said differential circuit according to the luminance signal provided in-between said differential circuit and said first multiplication circuit, is provided.

7. A horizontal contour emphasizing signal processor according to claim 6 wherein;

said selection circuit selecting the output-signal of said differential circuit having an amplitude larger than a predetermined threshold value, is provided.

8. A horizontal contour emphasizing signal processor according to claim 6 wherein;

said selection circuit selecting the output-signal of said differential circuit having a duration longer than a predetermined threshold value, is provided.

9. A horizontal contour emphasizing signal processor according to claim 7;

wherein a means to instruct the threshold value of output-signal amplitude of said differential circuit having an amplitude larger than a predetermined value to select the output-signal of said differential circuit, is provided.

10. A horizontal contour emphasizing signal processor according to claim 8 wherein;

a means to instruct the threshold-value of the output signal width of said differential circuit to select the output signal of said differential circuit, is provided.

* * * * *